United States Patent [19]

Easter

[11] Patent Number: 5,413,316
[45] Date of Patent: May 9, 1995

[54] ADJUSTABLE RATE AIR SPRING

[75] Inventor: Mark R. Easter, Indianapolis, Ind.

[73] Assignee: Bridgestone/Firestone, Inc., Akron, Ohio

[21] Appl. No.: 166,416

[22] Filed: Dec. 13, 1993

[51] Int. Cl.⁶ .............................................. F16F 9/04
[52] U.S. Cl. ................................ 267/64.24; 267/64.27
[58] Field of Search ............... 267/64.19, 64.21, 64.23, 267/64.24, 64.27, 64.28, 35, 118, 122; 280/711

[56] References Cited

U.S. PATENT DOCUMENTS

| | | | |
|---|---|---|---|
| 2,773,686 | 12/1956 | Nash | 267/64.23 |
| 2,984,476 | 5/1961 | Turner | 267/35 |
| 3,722,875 | 3/1973 | Hasse | 267/122 |
| 4,200,270 | 4/1980 | Merkle | 267/64.24 |
| 4,325,541 | 4/1982 | Korosladanvi et al. | 267/220 |
| 4,416,445 | 11/1983 | Coad | 267/140.13 |
| 4,509,730 | 4/1985 | Shtarkman | 267/35 |
| 4,629,170 | 12/1986 | Warmuth, II | 267/64.27 |
| 4,877,223 | 10/1989 | Hackett | 267/64.19 |
| 4,901,986 | 2/1990 | Smith | 267/140.1 |
| 4,974,820 | 12/1990 | Nakanish | 267/152 |
| 5,169,129 | 12/1992 | Hoffman | 267/64.27 |

Primary Examiner—Robert J. Oberleitner
Assistant Examiner—Chris Schwartz
Attorney, Agent, or Firm—David A. Thomas

[57] ABSTRACT

An air spring for providing a variable spring rate for a suspension system has an auxiliary fluid reservoir formed within a hollow interior of one of the spaced end members of the air spring. A flexible elastomeric sleeve extends between the end members and forms a main air chamber therebetween which is in communication with the auxiliary fluid reservoir. A fluid supply line communicates with the auxiliary fluid reservoir for changing the volume of fluid within the reservoir. In one embodiment, one end of the flexible sleeve is closed and forms a flexible membrane which extends across an entrance of the auxiliary reservoir and separates the air chamber from the auxiliary reservoir. In another embodiment, a separate inflatable bladder is mounted in the hollow interior of the end member and provides the flexible membrane which separates the air chamber from the auxiliary reservoir. Upon changing the volume of fluid within the auxiliary reservoir, the fluid membrane moves into and out of the hollow interior of the end member thereby changing the volume of the air chamber to change the spring rate of the air spring.

20 Claims, 3 Drawing Sheets

14
ADJUSTABLE RATE AIR SPRING

BACKGROUND OF THE INVENTION

1. Technical Field

The invention relates to suspension systems, and in particular, to an air suspension system used for vehicles. More particularly, the invention relates to an air spring having an auxiliary reservoir formed integrally in one of the end members of the air spring, which communicates with the main air chamber of the air spring to enable the spring rate of the air spring to be varied by adjusting the volume of fluid in the auxiliary reservoir.

2. Background Information

Air springs have been used for a considerable number of years for various applications, including use in vehicles for absorbing road shock imparted onto the wheels of a vehicle upon the wheel encountering a projection or depression in the roadway. Some examples of such air springs are shown in U.S. Pat. Nos. 4,564,177, 4,718,650, 4,787,606 and 4,787,608.

Each air spring will have a specific spring rate depending upon the design of the air spring components and its size, which will provide various ride characteristics for the vehicle on which the particular air spring is mounted. One of the factors which determines the spring rate is the volume of air contained within the flexible sleeve or bellows of the air spring. Varying the volume of air in the flexible sleeve of the air spring enables various spring rates to be achieved. This is presently being accomplished by various means, such as by supplying or removing air into or from the air spring through various control valves, and by the use of auxiliary air reservoirs which are fluidly connected to the vehicle air spring, which is mounted on and extends between spaced structural members of the vehicle. When a vehicle wheel encounters a depression or projection in the roadway, air will be introduced into or removed from the vehicle air spring by means of an auxiliary reservoir to change the volume of air within the air spring, thereby changing the spring rate in order to provide the desired ride characteristics for the vehicle. The smaller the volume of the air chamber, firmer will be the ride provided thereby.

Heretofore, auxiliary reservoirs for air springs usually consisted of a remotely mounted reservoir which was connected by a hose or other fluid communication lines to the air chamber of the air spring. These remotely located reservoirs generally contained various means for adjusting the volume of the air chamber within the reservoir. Some examples of prior art air springs containing auxiliary reservoirs are shown in U.S. Pat. Nos. 2,115,072, 3,039,761, 4,159,105, 4,592,540, 4,743,000 and 5,169,129.

Although these remotely located reservoirs do provide for a variable spring rate air spring, it increases considerably the space required for mounting of the air suspension system, which in many vehicles is extremely limited. In all of these known prior art air spring suspension systems which use an auxiliary reservoir, the reservoir is located remote from the air spring and is not formed as an integral part thereof, as is the air spring of the present invention.

Examples of other prior art suspension systems and components therefor which are of interest to the present invention are shown in the following U.S. Patents.

U.S. Pat. No. 3,722,875 discloses a suspension unit that is adjustable through the use of counteracting air and liquid-filled bellows. Counteracting air bellows are separated from each other by a metal plate having an adjustable orifice positioned therein. The air-filled bellows are surrounded by liquid-filled bellows which are used for damping. Liquid bladders are positioned within the air bellows, so that they may be filled or evacuated with liquid, which will adjust the spring stiffness of the suspension device.

U.S. Pat. No. 4,325,541 discloses a telescopic shock absorber having load proportional limited damping. The telescopic shock absorber has a rolling diaphragm and an auxiliary diaphragm. The auxiliary diaphragm provides a variable damping force for the shock absorber.

U.S. Pat. No. 4,509,730 discloses a flexible wall spring damper which is formed from a side wall and a diaphragm which may be integrally formed with the side wall. A gas chamber is formed between the mounting member and the flexible diaphragm, and a valve allows the gas chamber to expand, thus affecting the spring rate of the spring damper.

U.S. Pat. No. 4,629,170 discloses an air spring having both inner and outer chambers. An inner membrane forms the inner chamber, and an outer membrane forms the outer chamber. Each of the chambers has continuously variable independent pressurization means which provide variable spring rate for the air spring.

U.S. Pat. No. 4,901,986 discloses a hydraulic engine mount that has various damping characteristics. An air transfer tube allows air to enter or leave a pneumatic bladder, and an inflation line delivers air from a variable pressure source to the bladder. The bladder moves towards and away from a piston surface upon deflation and inflation, thus varying the damping characteristics of the engine mount.

U.S. Pat. No. 4,974,820 shows a shock absorber which utilizes a main bellows and a sub-bellows. The sub-bellows provides varying natural resonance frequency for the main bellows as a result of the repercussion of the sub-bellows.

However, none of the prior art suspension systems, and in particular those which utilize an auxiliary reservoir, of which I am aware, forms the auxiliary reservoir as an integral part of the air spring.

SUMMARY OF THE INVENTION

Objectives of the invention include providing a variable rate air suspension system in which an auxiliary reservoir is formed as an integral part of the air spring by forming it in one of the end members, and wherein the reservoir is separated from a main air chamber of the air spring by a flexible membrane which moves with respect to the main air chamber and the auxiliary reservoir to vary the volume of the main air chamber to provide a variable spring rate for the vehicle air spring.

A further objective of the invention is to provide such a variable rate air spring in which the auxiliary reservoir can be formed either in an end cap or piston of the air spring, depending upon the particular suspension application in which the air spring will be used.

Another objective of the invention is to provide such a variable rate air spring in which a flexible membrane which separates the main air chamber from the auxiliary reservoir is formed by a closed end of an elastomeric sleeve which extends between the end members to form the main air chamber, or by utilizing a separate fluid-filled bellows which is mounted within either the end cap and/or piston.

Still another objective of the invention is to provide such an improved variable rate air spring in which both of the air chamber and auxiliary reservoir are connected to the same or to a separate fluid supply, and if desired, the auxiliary reservoir can be supplied with an incompressible fluid for achieving various spring rate characteristics.

These objectives and advantages are obtained by the air spring of the present invention, the general nature of which may be stated as an air spring for mounting between spaced components of a vehicle to absorb road shock imparted onto a wheel of said vehicle, wherein the air spring includes a pair of spaced end members and an intervening flexible sleeve extending therebetween for forming an air chamber; a hollow interior is formed in one of said end members and provides an auxiliary fluid reservoir therein which communicates with the air supply chamber; a flexible membrane separates the air supply chamber from the auxiliary reservoir; and fluid supply means communicates with the auxiliary fluid reservoir for changing the volume of fluid within said reservoir to change the volume of air in the air supply chamber by moving the flexible membrane with respect to said air supply chamber to change the spring rate of the air spring.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENT

Figure 1:
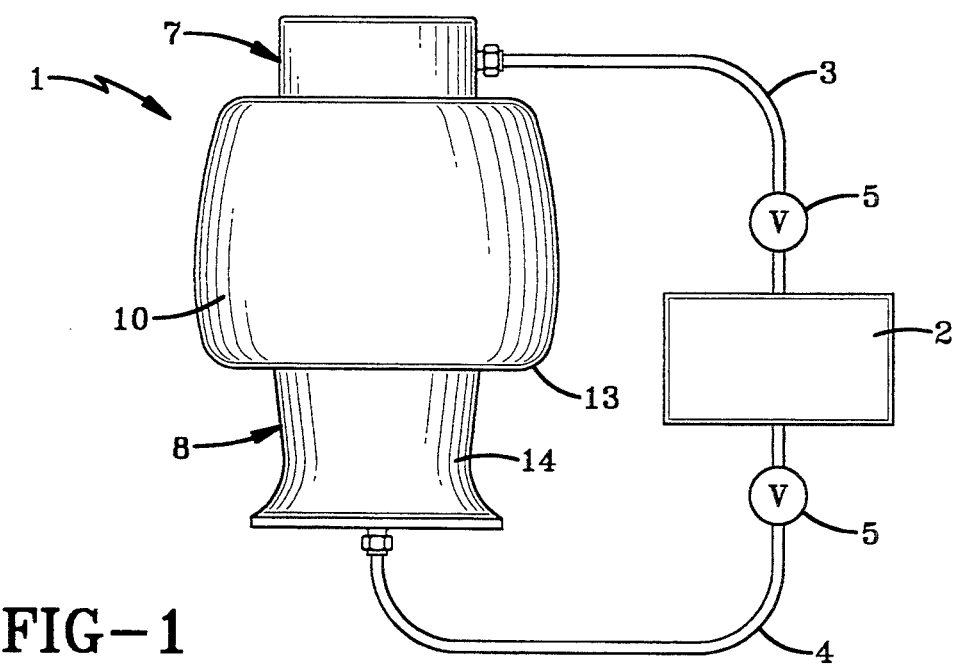
FIG. 1 is a diagrammatic view of a first embodiment of the improved adjustable rate air spring of the invention connected to a remote compressor.
Figure 2:
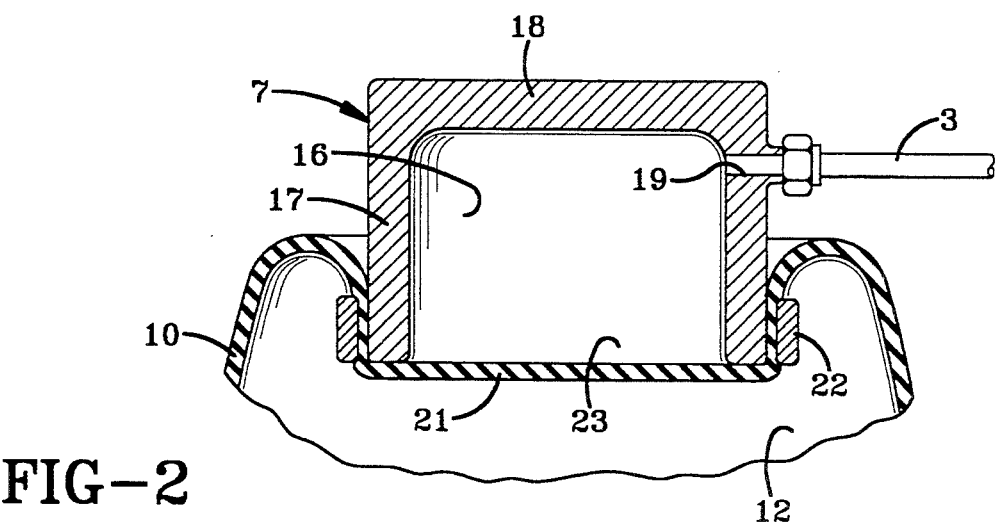
FIG. 2 is an enlarged fragmentary sectional view of the top end cap portion of the air spring of FIG. 1.
Figure 3:
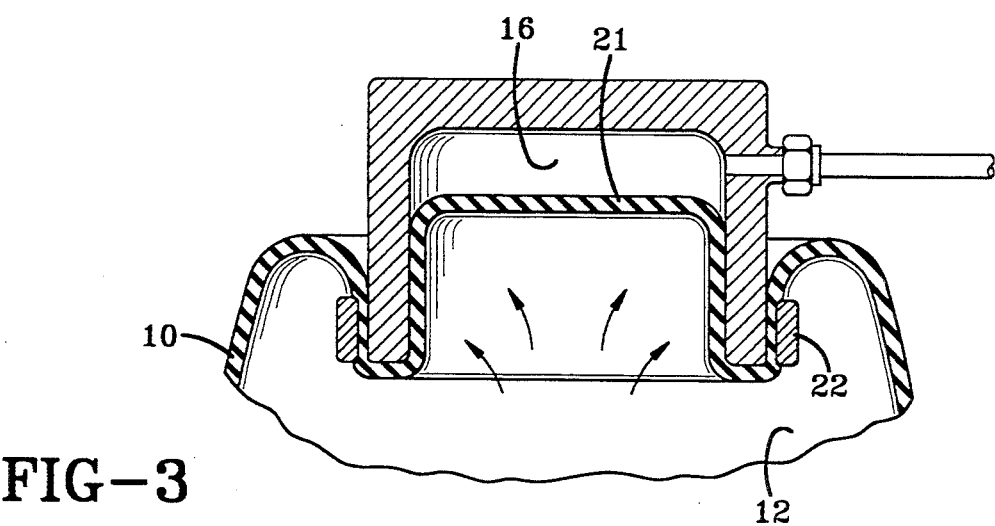
FIG. 3 is a sectional view similar to FIG. 2 with the flexible membrane shown in an expanded position in the auxiliary reservoir of the end cap.

A first embodiment of the improved air spring of the present invention is indicated generally at 1, and is shown particularly in FIGS. 1–3. Air spring 1 is shown connected to a supply of compressed air or other fluid, which is indicated generally diagrammatically at 2, by a pair of fluid supply lines 3 and 4, each of which may contain a control valve 5. It is readily understood that fluid supply 2 could be replaced with two separate fluid supplies, each supplying the same type or different type of fluid, without affecting the concept of the invention.

Air spring 1 is of the type which is adapted to be mounted between spaced structural components of a vehicle in a well-known manner. The air spring absorbs road shock imparted on the vehicle tires, upon the tires encountering a depression or projection in the roadway. Air spring 1 includes a pair of spaced end members, one of which is an end cap 7, and a piston 8. A flexible elastomeric sleeve 10 extends between end cap 7 and piston 8 and is sealingly clamped thereto, as described below, and forms a hollow interior which forms an air chamber 12 therein. Flexible sleeve 10 has a generally cylindrical configuration, of the type used for many types of air springs, and is formed of an elastomeric material, and generally will contain internal reinforcing cords (not shown) which are trapped generally within one or two plies of elastomeric materials. Preferably, one end of sleeve 10 is in a rolled state, and forms a rolling lobe 13 with respect to piston 8, and rolls along an annular wall 14 thereof, when the end members move axially with respect to each other.

In the first embodiment of the air spring, shown particularly in FIGS. 2 and 3, end cap 7 is formed with a hollow interior 16 by a cylindrical side wall 17 and top closure wall 18. Fluid supply line 3 communicates with interior 16 through a hole 19 formed in side wall 17 in order to admit or discharge fluid into and out of the auxiliary reservoir of interior 16.

Figure 5:
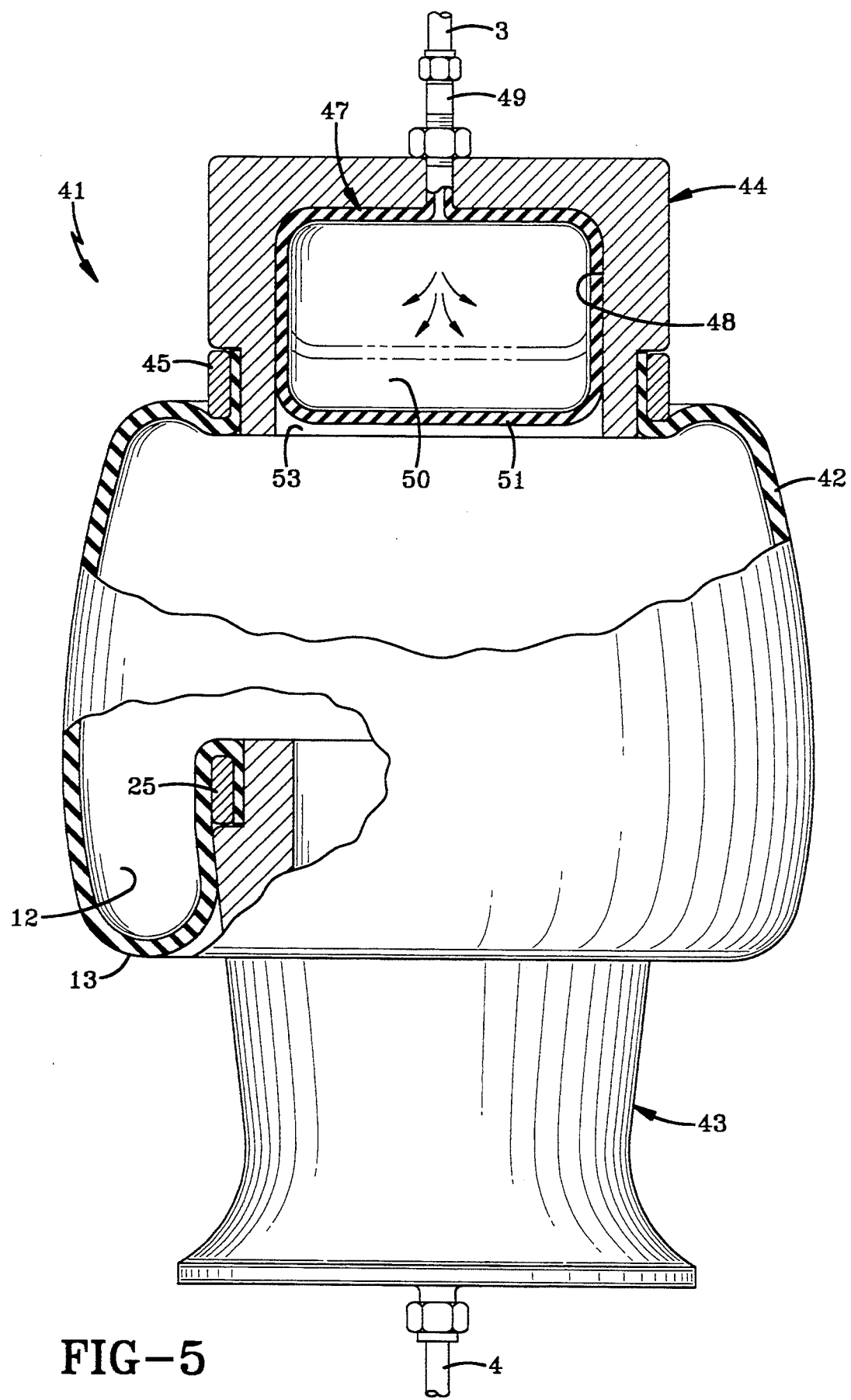
FIG. 5 is an elevational view of a third embodiment of the adjustable rate air spring of the invention with portions broken away and in section, showing a separate elastomeric bladder mounted within the end cap, and shown in an expanded position in full lines and in an unexpanded position in dot-dash lines.

In accordance with one of the main features of the invention, elastomeric sleeve 10 is formed with a closed end 21 which is sealingly clamped against an outer surface of end cap wall 17, by an annular clamping band 22. Band 22 compresses the sleeve against the side wall, and closed end 21 forms a flexible elastomeric membrane which covers an entrance 23 to hollow interior 16. The opposite end of sleeve 10 preferably will be open, such as shown in FIG. 5, and will be sealingly clamped against a top end of piston 8 by a second sealing clamp 25.

When end wall or flexible membrane 21 is in its normal at-rest state, it will assume the position as shown in FIG. 2, that is, it extends generally straight across entrance 23. When membrane 21 is in this position, it preferably is void of reinforcing cords in this area. However, when membrane 21 is assembled in a normal at-rest state, such as shown in FIG. 3, it may contain reinforcing cords.

Figure 4:
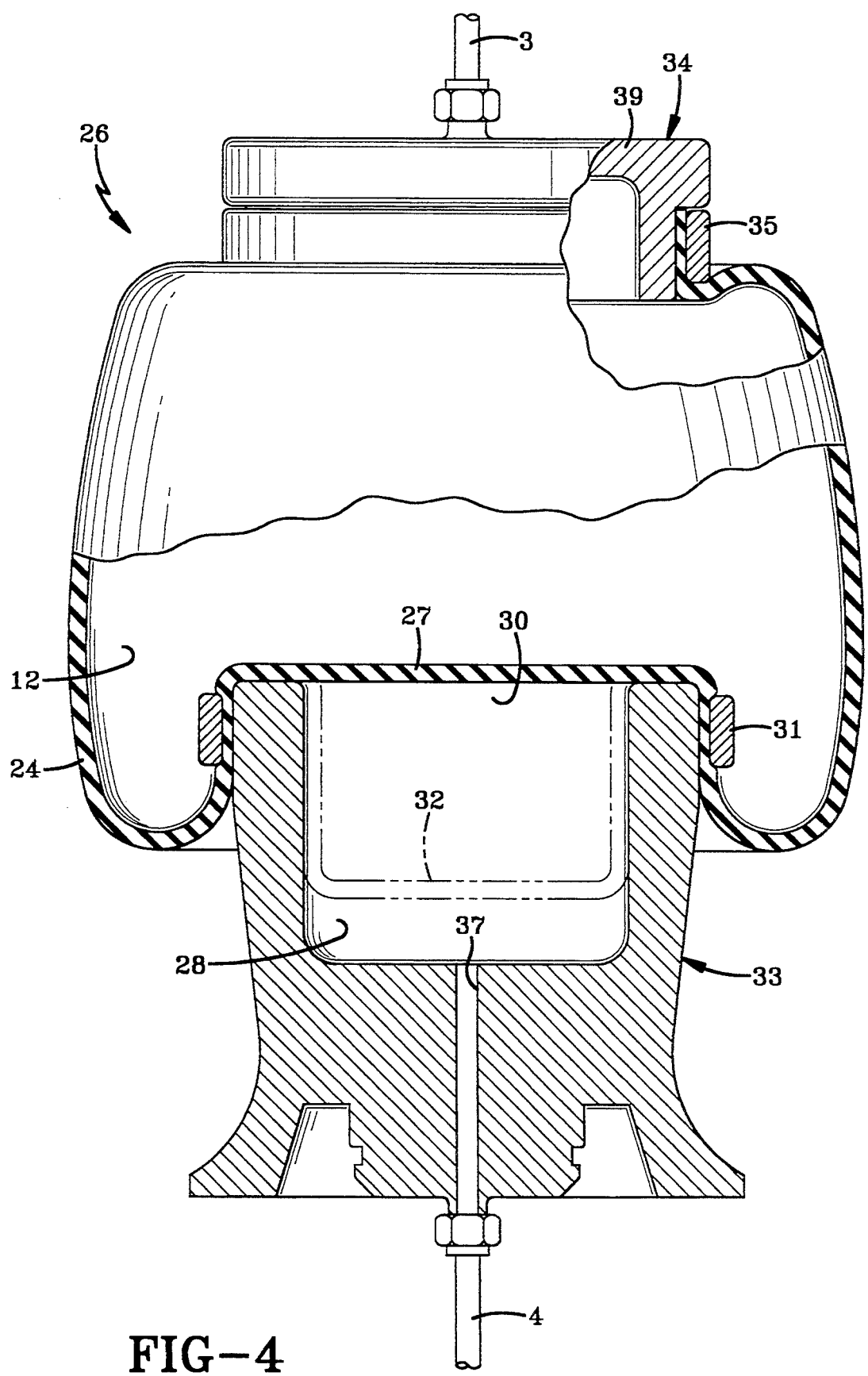
FIG. 4 is an elevational view of a second embodiment of the adjustable rate air spring with portions broken away and in section, with the flexible membrane shown in full lines in an unexpanded position extending across the entrance of the auxiliary reservoir, and in dot-dash lines in an expanded position within the auxiliary reservoir which is formed in the piston.

A second embodiment is shown in FIG. 4 and is indicated generally at 26. In this embodiment, an elastomeric sleeve 24 is formed with a closed end 27, which is located adjacent an auxiliary reservoir 28 formed by a hollow interior of a piston 33. In this embodiment, the closed end of sleeve 24 forms the flexible membrane which extends across an entrance 30 into auxiliary reservoir 28. An annular clamping band 31 sealingly clamps the flexible sleeve about entrance 30, whereby membrane 27 extends in a generally straight manner across entrance 30. Membrane 27 is shown expanded into reservoir 28 by dot-dash lines 32. Alternately, dot-dash lines 32 could represent the natural at-rest position of membrane 27, especially if it contains reinforcing cords. Whereas when flexible membrane 27 assumes the full-line position as shown in FIG. 4 when in its normal at-rest position, flexible membrane 27 would be void of internal reinforcing cords to enable it to stretch upon being forced into auxiliary reservoir 28, as shown by dot-dash lines 32.

In the embodiment shown in FIG. 4, preferably the opposite end of sleeve 10 is open and is secured in a fluid-tight sealing clamped engagement with end cap 34 by a clamping band 35. Fluid line 4 will communicate with auxiliary reservoir 28 through a hole 37 formed in the body of piston 33. Fluid line 3 will communicate with main air supply chamber 12 which is formed within sleeve 24, through line 3 which extends through a top wall 39 of end cap 34.

Embodiment 26 shown in FIG. 4 is generally similar to that of FIGS. 1–3, with the exception that the auxiliary reservoir in embodiment 1 is formed in the end cap, and in embodiment 26, the auxiliary reservoir is formed in the piston. In both embodiments, the auxiliary reservoir communicates with main air chamber 12, and is separated therefrom by a flexible membrane formed by a closed end wall of elastomeric sleeves 10 and 24.

Thus, to change the ride characteristic of air springs 1 and 26, shown in FIGS. 1–4, a fluid is admitted into or removed from the auxiliary reservoirs through the connected fluid supply line. For example, assume that flexible membrane assumes the normal at-rest position shown by dot-dash lines in FIG. 4. Thus, admitting fluid into reservoir 28 will expand flexible membrane 27 out of the auxiliary reservoir and into the main air chamber to decrease the volume thereof. When fluid is removed from the auxiliary reservoir, it enables the flexible membrane to expand into the auxiliary reservoir, as shown by solid lines in FIG. 3 and dot-dash lines in FIG. 4, to increase the volume of main air chamber 12. The greater the volume of chamber 12, softer will be the ride provided by the air spring. The fluid generally will be air, although for certain applications will be an incompressible liquid.

A third embodiment of the air spring of the present invention is indicated generally at 41, and is shown in FIG. 5. In this embodiment, a usual elastomeric sleeve 42 which is open at both ends, is sealingly connected to a piston 43 and to an end cap 44 by sealing bands 25 and 45, respectively, to form main air chamber 12 therebetween. Fluid supply line 4 communicates with air chamber 12 in a usual manner by extending through piston 43.

However, in accordance with the main feature of air spring 41, the auxiliary reservoir is formed by a separate inflatable bladder 47 which is formed of an elastomeric member and mounted within a hollow interior 48 of end cap 44. Bladder 47 preferably has a usual inflation valve 49, which is connected to fluid supply line 3 for admitting or removing a fluid, preferably air, into and out of hollow interior 50 of bladder 47 for expanding and collapsing an end wall 51 thereof. End wall 51 provides the main flexible sealing member across an entrance 53 of the auxiliary reservoir in a similar manner as does the closed end of flexible sleeves 10 and 24 for the embodiments of FIGS. 2 and 4. Thus, by inflating or deflating bladder 47, it will cause the bladder, and particularly end wall 51, to move into or out of the auxiliary reservoir, as shown by the solid and dot-dash lines thereof, thereby increasing or decreasing the volume of main air chamber 12 to change the ride characteristics of the air spring, as described above with respect to the first two embodiments.

Thus, by changing the volume of fluid, whether it be air or other compressible fluid, or an incompressible liquid, within the auxiliary air chamber, it will change the volume of the main air spring, and correspondingly, the spring rate provided by the air spring. Most importantly, the improved air spring of the present invention provides for the formation of the auxiliary reservoir entirely within the usual components and confines of an air spring, that is, within the end cap or piston. This results in a very slight increase, if any, to the overall size of the air spring, and eliminates the use of a remotely located auxiliary reservoir with the required connecting fluid supply conduits extending therebetween.

It is also readily understood that the main air chamber of the air spring, does not require a separate source of air, and could be self contained with only the auxiliary reservoir being connected to a source of compressed air or other fluid. However, in most installations, both the auxiliary reservoir and main air chamber will be connected to the same or separate supply of fluid. Furthermore, the improved air spring only requires that the end cap or piston by modified somewhat to increase the size of the interior thereof, in combination with forming the elastomeric sleeve which forms the main air chambr with a closed end, or by the supplying and mounting a separate inflatable bladder within either the end cap, as shown in FIG. 5, or within the hollow interior of the piston.

Accordingly, the adjustable rate air spring is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or principles of the invention, the manner in which the improved adjustable rate air spring is constructed and used, the characteristics of the construction, and the advantageous, new and useful results obtained; the new and useful structures, devices, elements, arrangements, parts and combinations, are set forth in the appended claims.

I claim:

1. An adjustable rate air spring including a pair of spaced end members and a flexible sleeve extending therebetween forming an air chamber, said sleeve having a pair of opposed ends, at least one of which is closed; one of said end members being formed with a hollow interior which forms an auxiliary reservoir; an entrance formed in said one end member and located between said auxiliary reservoir and the air chamber; the closed end of the flexible sleeve extends across the entrance of the auxiliary reservoir and provides a flexible membrane separating the air chamber from said auxiliary reservoir; air supply means communicating with the air chamber for supplying said chamber with pressurized air; and fluid supply means of pressurized air communicating with the hollow interior of the said one end member for changing the volume of fluid in the auxiliary reservoir thereby changing the volume of the air chamber by moving the flexible membrane with respect to the air chamber to change the spring rate of said air spring.

2. The air spring defined in claim 1 in which the said one end member is a piston and the other of said end members is an end cap.

3. The air spring defined in claim 2 in which the flexible sleeve has a rolling lobe which moves along an outer wall of the piston, as the piston moves with respect to the opposite end member.

4. The air spring defined in claim 2 in which the piston has a substantially annular shaped body, with said hollow interior being formed in said body; and in which clamp means sealingly clamps the flexible sleeve against an outer surface of said body, whereby the closed end of the flexible sleeve extends across the entrance to said hollow interior of the piston to form the flexible membrane.

5. The air spring defined in claim 2 in which a passage is formed in the piston and communicates with the hollow interior and the fluid supply means for transferring fluid into and out of said hollow interior.

6. The air spring defined in claim 1 in which another end of the sleeve opposite of the closed end is open; and in which an annular clamping band compresses the sleeve adjacent said open end against the other of said end members for sealingly clamping said open end to said other end member.

7. The air spring defined in claim 1 including clamp means for sealingly clamping the closed end of the flexible sleeve against the said one end member providing the flexible membrane which extends across the entrance of the hollow interior of said one end member.

8. The air spring defined in claim 1 in which the said one end member is an end cap and the other of said end members is a piston.

9. An air spring for mounting between spaced components of a vehicle to absorb road shock imparted onto a wheel of said vehicle, said air spring including a pair of spaced end members and an intervening flexible sleeve extending therebetween for forming an air chamber, said sleeve having a pair of open ends; clamp means for sealingly clamping the open ends of the flexible sleeve against the spaced end members; a hollow interior formed in one of said end members providing an auxiliary fluid reservoir therein which communicates with the air chamber; an inflatable flexible bladder mounted within the hollow interior formed in the said one end member, said bladder forming a flexible membrane separating the air chamber from the auxiliary reservoir; and fluid supply means communicating with the auxiliary fluid reservoir for changing the volume of fluid within said reservoir to change the volume of air in the air chamber by moving the flexible membrane with respect to said air chamber to change the spring rate of the air spring.

10. The air spring defined in claim 9 in which one of the end members is an end cap and the other of said end members is a piston.

11. The air spring defined in claim 9 in which the flexible bladder includes a stem which ends through an opening formed in said one end member for connection to the fluid supply means for transferring fluid into and out of said bladder to change the volume of the air supply chamber.

12. An adjustable rate air spring including a pair of spaced end members and a flexible sleeve extending therebetween forming an air chamber, said sleeve having a pair of opposed ends, at least one of which is closed; one of said end members being a piston and the other of said members being an end cap; said flexible sleeve having a rolling lobe which moves along an outer wall of the piston, as the piston moves with respect to the end cap; said piston being formed with a hollow interior which forms an auxiliary reservoir; said piston having an entrance formed therein located between said auxiliary reservoir and the air chamber; the closed end of the flexible sleeve extends across the entrance of the auxiliary reservoir and provides a flexible membrane separating the air chamber from said auxiliary reservoir; air supply means communicating with the air chamber for supplying said chamber with pressurized air; and fluid supply means communicating with the hollow interior of the said one end member for changing the volume of fluid in the auxiliary reservoir thereby changing the volume of the air chamber by moving the flexible membrane with respect to the air chamber to change the spring rate of said air spring.

13. The air spring defined in claim 12 in which the fluid supply means is an incompressible liquid.

14. An adjustable rate air spring including a pair of spaced end members and a flexible sleeve extending therebetween forming an air chamber, said sleeve having a pair of opposed ends, at least one of which is closed; one of said end members being formed with a hollow interior which forms an auxiliary reservoir; an entrance formed in said one end member and located between said auxiliary reservoir and the air chamber; clamp means for sealingly clamping the closed end of the flexible sleeve against the said one end member whereby the closed end of the flexible membrane extends across the entrance of the hollow interior of the said one end member; air supply means communicating with the air chamber for supplying said chamber with pressurized air; and fluid supply means communicating with the hollow interior of the said one end member for changing the volume of fluid in the auxiliary reservoir thereby changing the volume of the air chamber by moving the flexible membrane with respect to the air chamber to change the spring rate of said air spring.

15. The air spring defined in claim 14 in which the said one end member has an annular wall; and in which the clamp means is an annular ring which clamps the flexible sleeve against an outer surface of said wall.

16. An adjustable rate air spring including a pair of spaced end members and a flexible sleeve extending therebetween forming an air chamber, said sleeve having a pair of opposed ends, one of said ends being closed and the other of said end being open; one of said end members being formed with a hollow interior which forms an auxiliary reservoir; an entrance formed in said one end member and located between said auxiliary reservoir and the air chamber; the closed end of the flexible sleeve extends across the entrance of the auxiliary reservoir and provides a flexible membrane separating the air chamber from said auxiliary reservoir; air supply means communicating with the air chamber for supplying said chamber with pressurized air; fluid supply means communicating with the hollow interior of the said one end member for changing the volume of fluid in the auxiliary reservoir thereby changing the volume of the air chamber by moving the flexible membrane with respect to the air chamber to change the spring rate of said air spring; and an annular clamping band compressing the flexible sleeve adjacent the open end thereof against the other of said end members for sealingly clamping said open end to said other end member.

17. An adjustable rate air spring including a pair of spaced end members and a flexible sleeve extending therebetween forming an air chamber, said sleeve having a pair of opposed ends, at least one of which is closed; one of said end members being a piston formed with a hollow interior which forms an auxiliary reservoir and the other of said members being an end cap; said piston having a substantially annular shaped body, with said hollow interior being formed in said body; an entrance formed in said piston and located between said auxiliary reservoir and the air chamber; clamp means sealingly clamping the flexible sleeve against an outer surface of said body, whereby the closed end of the flexible sleeve extends across the entrance to said hollow interior of the piston to form the flexible membrane separating the air chamber from said auxiliary reservoir; air supply means communicating with the air chamber for supplying said chamber with pressurized air; and fluid supply means communicating with the hollow interior of the said one end member for changing the volume of fluid in the auxiliary reservoir thereby changing the volume of the air chamber by moving the flexible membrane with respect to the air chamber to change the spring rate of said air spring.

18. An adjustable rate air spring including a pair of spaced end members and a flexible sleeve extending therebetween forming an air chamber, said sleeve having a pair of opposed ends, at least one of which is closed; one of said end members being a piston formed with a hollow interior which forms an auxiliary reservoir and the other of said end members being an end cap; said flexible sleeve having a rolling lobe which moves along an outer wall of the piston, as the piston moves with respect to the opposite end member; an entrance formed in said piston and located between said auxiliary reservoir and the air chamber; the closed end of the flexible sleeve extends across the entrance of the auxiliary reservoir and provides a flexible membrane separating the air chamber from said auxiliary reservoir; air supply means communicating with the air chamber for supplying said chamber with pressurized air; fluid supply means communicating with the hollow interior of the piston for changing the volume of fluid in the auxiliary reservoir thereby changing the volume of the air chamber by moving the flexible membrane with respect to the air chamber to change the spring rate of said air spring; and a passage formed in the piston communicating with the hollow interior and the fluid supply means for transferring fluid into and out of said hollow interior.

19. An air spring for mounting between spaced components of a vehicle to absorb road shock imparted onto a wheel of said vehicle, said air spring including a pair of spaced end members and an intervening flexible sleeve extending therebetween for forming an air chamber; a hollow interior formed in one of said end members providing an auxiliary fluid reservoir therein which communicates with the air chamber; an inflatable flexible bladder mounted within the hollow interior formed in the said one end member, said bladder having a stem extending through an opening formed in said one end member, and forming a flexible membrane separating the air chamber from the auxiliary reservoir; and fluid supply means for communicating with the auxiliary fluid reservoir and for connection to the stem for changing the volume of fluid within said reservoir by transferring fluid into and out of said bladder to change the volume of air in the air chamber by moving the flexible membrane with respect to said air chamber to change the spring rate of the air spring.

20. An air spring for mounting between spaced components of a vehicle to absorb road shock imparted onto a wheel of said vehicle, said air spring including a pair of spaced end members and an intervening flexible sleeve extending therebetween for forming an air chamber; a hollow interior formed in one of said end members providing an auxiliary fluid reservoir therein which communicates with the air chamber; said flexible sleeve having a closed end which extends across an entrance of the auxiliary reservoir and forms a flexible membrane separating the air chamber from the auxiliary reservoir; the said one end member having an annular wall which forms a portion of the auxiliary fluid reservoir; clamp means for sealingly clamping the closed end of the flexible sleeve against the annular wall surrounding said entrance to the auxiliary reservoir; and fluid supply means communicating with the auxiliary fluid reservoir for changing the volume of fluid within said reservoir to change the volume of air in the air chamber by moving the flexible membrane with respect to said air chamber to change the spring rate of the air spring.

* * * * *